(12) United States Patent
Wu (10) Patent No.: US 9,027,212 B2
(45) Date of Patent: May 12, 2015

(54) DEVICE CLIP

(71) Applicant: Race Wu, Taichung (TW)

(72) Inventor: Race Wu, Taichung (TW)

( * ) Notice: Subject to any disclaimer, the term of this patent is extended or adjusted under 35 U.S.C. 154(b) by 216 days.

(21) Appl. No.: 13/650,901

(22) Filed: Oct. 12, 2012

(65) Prior Publication Data

US 2013/0333167 A1    Dec. 19, 2013

(30) Foreign Application Priority Data

Jun. 15, 2012   (TW) .............................. 101211635 U (51) Int. Cl.
*F16B 2/20*   (2006.01)
*F16B 2/10*   (2006.01)
*G03B 17/56*   (2006.01)

(52) U.S. Cl.
CPC ............... *F16B 2/10* (2013.01); *Y10T 24/4453* (2015.01); *G03B 17/561* (2013.01)

(58) Field of Classification Search
CPC ......... G03B 17/561; F16B 2/10; D06F 55/02; B65D 33/1675
USPC ................. 24/517, 3.1, 3.12, 573.15, 578.15, 24/573.11, 24, 132 R, 489, 518, 30.5 R; 224/269
See application file for complete search history.

(56) References Cited

U.S. PATENT DOCUMENTS

| | | | | |
|---|---|---|---|---|
| 381,265 | A | * | 4/1888 | Martens ...................... 24/30.5 R |
| 5,201,099 | A | * | 4/1993 | Campbell ........................ 24/198 |
| 6,145,169 | A | * | 11/2000 | Terzuola et al. ................ 24/170 |
| 2006/0101627 | A1 | * | 5/2006 | Ida .................................. 24/517 |

* cited by examiner

*Primary Examiner* — Robert J Sandy
*Assistant Examiner* — Michael Lee
(74) *Attorney, Agent, or Firm* — Muncy, Geissler, Olds & Lowe, P.C.

(57) ABSTRACT

A device clip includes a first jaw member, and a second jaw member having fixed end pivotally connected to one end of the first jaw member and a free end provided with a rod member that is movable along the major axis of the second jaw member by an external force and can return to its former position when the external force disappears. Thus, the other end of the first jaw member is detachably lockable to the rod member at the free end of the second jaw member for enabling the device clip to conveniently and steadily link two objects together, for example, to link a camera bag to a backpack.

8 Claims, 14 Drawing Sheets

DEVICE CLIP

BACKGROUND OF THE INVENTION

1. Field of the Invention

The present invention relates to fastener means and more particularly, to a device clip for linking a first object to a second object.

2. Description of the Related Art

In order to facilitate movement, most people when they travel carrying a backpack with a camera usually will put the camera in the backpack. When going to take pictures, they have to open the backpack and then pick up the camera from the backpack. It is inconvenient and time-consuming inconvenience to access to the camera in this manner. On the contrary, carrying a camera on the shoulder for the convenience of taking pictures at any time, will, in turn, limited mobility, resulting in facing a dilemma.

Figure 1:
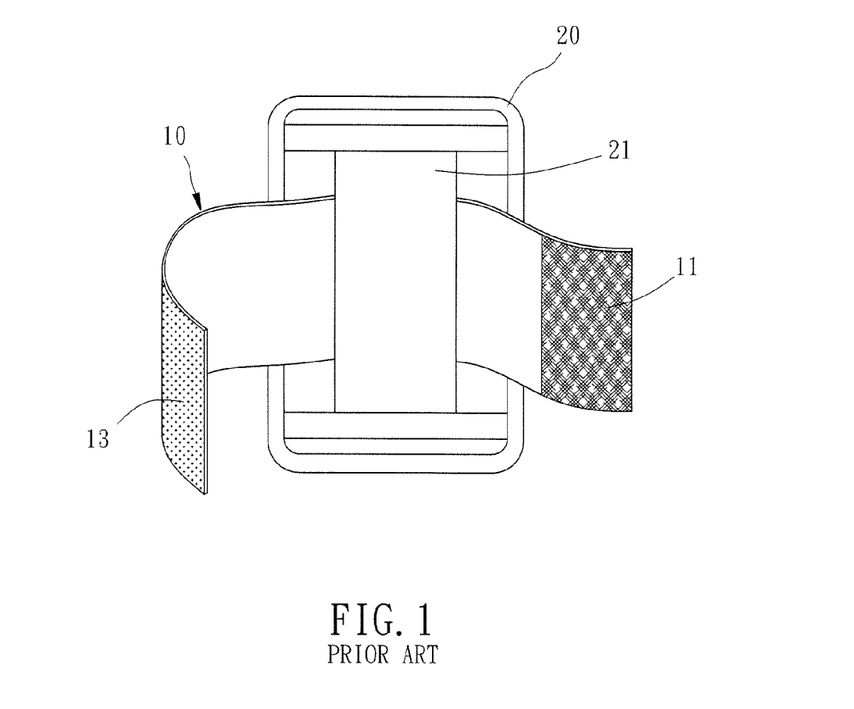
FIG. 1 is a schematic drawing illustrating a Velcro tape inserted through a loop of a camera bag according to the prior art.

In order to solve this problem, a user may insert a Velcro tape 10 (the so-called "magic tape"), as shown in FIG. 1, through a loop 21 of his(her) camera bag 20 and a loop (not shown) of his(her) backpack (not shown) and then fasten up loop tape portion 11 and hook tape portion 13 of the Velcro tape 10 to secure the camera bag 20 to the backpack. Thus, when the user carries the backpack on the back, the camera bag 20 is kept attached to the outside of the backpack, facilitating access to the camera at any time. However, after a long use, the Velcro tape 10 will reduce its binding force, resulting in connection instability between the backpack and the camera bag 20. When the binding force of the Velcro tape 10 becomes insufficient, the user must replace the Velcro tape 10.

SUMMARY OF THE INVENTION

The present invention has been accomplished under the circumstances in view. It is the main object of the present invention to provide a device clip, which can conveniently and firmly secure two objects, for example, a camera bag and a backpack together.

To achieve this and other objects of the present invention, a device clip comprises a first jaw member having a coupling part, a locking part and a body part connected between the coupling part and the locking part, and a second jaw member having a coupling part, a locking part and a body part connected between the coupling part and the locking part. The coupling part of the second jaw member is coupled to the coupling part of the first jaw member so that the locking part of the second jaw member can be locked to the locking part of the first jaw member and then unlocked.

Other advantages and features of the present invention will be fully understood by reference to the following specification in conjunction with the accompanying drawings, in which like reference signs denote like components of structure.

DETAILED DESCRIPTION OF THE INVENTION

Before reviewing the following description of the invention, it is to be understood that inner, outer, up, down and other directional terms as defined throughout the whole specification are based on the direction indicated in the annexed drawings.

Figure 2:
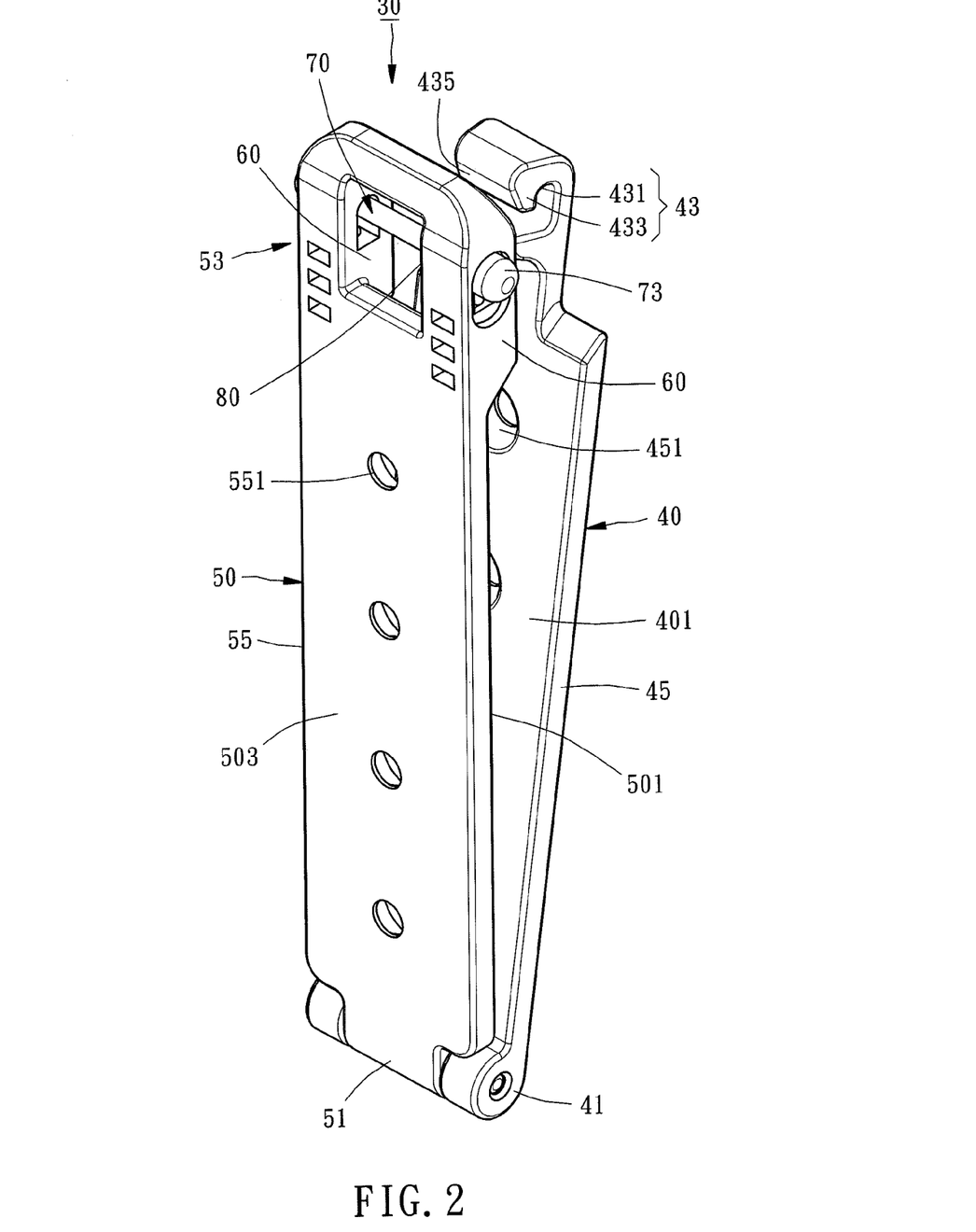
FIG. 2 is an elevational view of an open status of a device clip in accordance with a first embodiment of the present invention.
Figure 3:
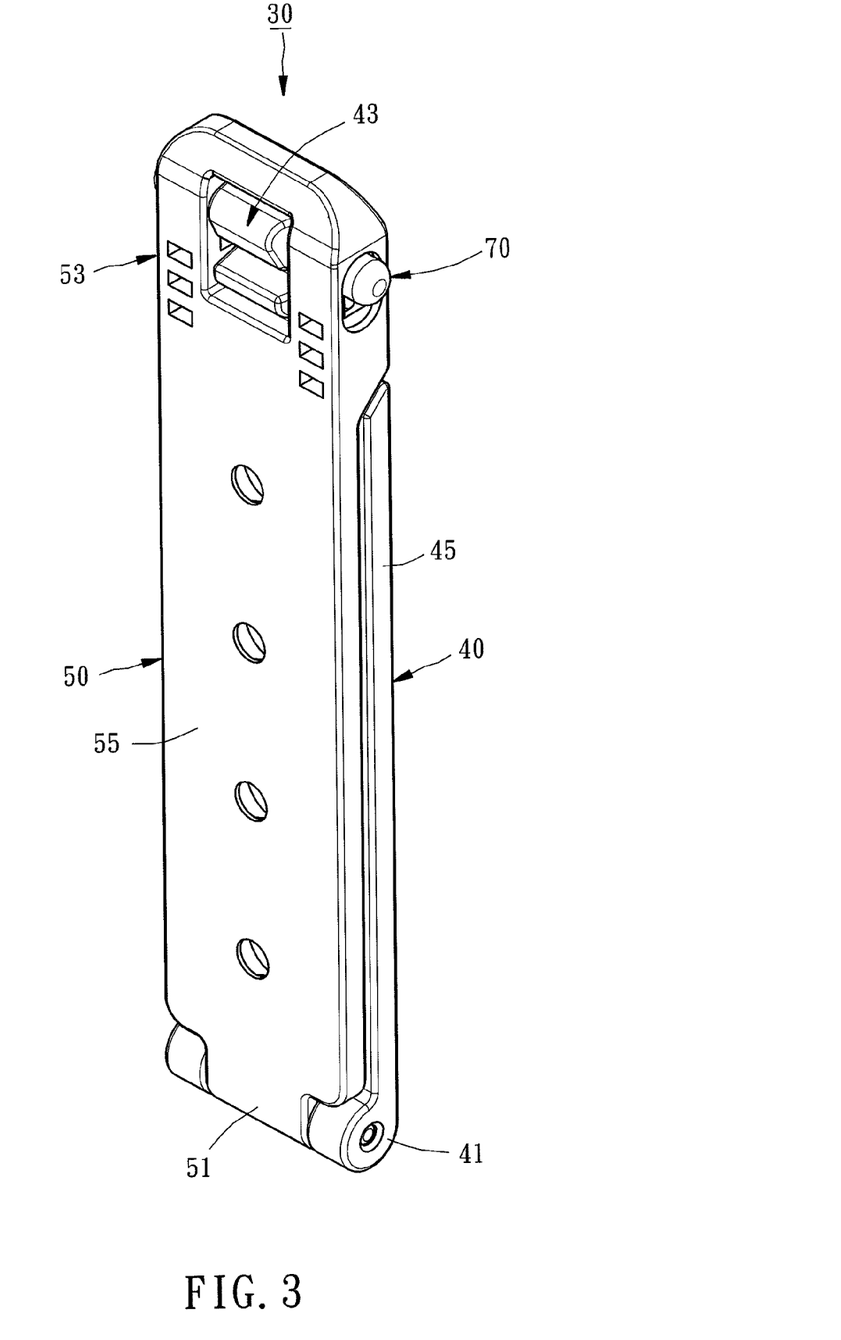
FIG. 3 is similar to FIG. 2, illustrating the first jaw member and the second jaw member closed.

Referring to FIGS. 2 and 3, a device clip 30 in accordance with a first embodiment of the present invention is shown comprising an elongated first jaw member 40 and an elongated second jaw member 50.

The first jaw member 40, can be made of, but not limited to, plastics, comprising a pivot connection part 41, a locking part 43, and a body part 45 connected between the pivot connection part 41 and the locking part 43. In this embodiment, the locking part 43 is a hook formed integral with one end of the body part 45. The pivot connection part 41 is formed of two protrusions extend that extend from an opposite end of the body part 45 toward an inner side 401 of the first jaw member 40. Further, the locking part 43 comprises a retaining groove 431, a front hook portion 433 extending from one side of the retaining groove 431 in direction toward the inner side 401 of the first jaw member 40, and a guide face 435 located on a front side of the front hook portion 433. The body part 45 comprises a plurality of through holes 451 for the insertion of rivets or like fastening members to affix the first jaw member 40 to, for example, a backpack, facilitating linking between the backpack and another object at any time.

The second jaw member 50, can be made of, but not limited to, plastics, comprising a pivot connection part 51 pivotally connected to the pivot connection part 41 of the first jaw member 40, a locking unit 53 detachably lockable to the locking part 43 of the first jaw member 40, and a body part 55 connected between the pivot connection part 51 and the locking unit 53. In this embodiment, the locking part 43 is a hook formed integral with one end of the body part 45. The locking unit 53 comprises two lugs 60 protruding in direction toward an inner side 501 of the second jaw member 50, a rod member 70 inserted through the two lugs 60, and an escape hole 80 cut through the inner side 501 and outer side 503 of the second jaw member 50 corresponding to the rod member 70. Thus, the body of the rod member 70 forms a locking part 71.

Further, the body part 55 comprises a plurality of through holes 551 for the insertion of rivets or like fastening members to affix the first jaw member 40 to, for example, a backpack, facilitating linking between the backpack and another object at any time.

Figure 4:
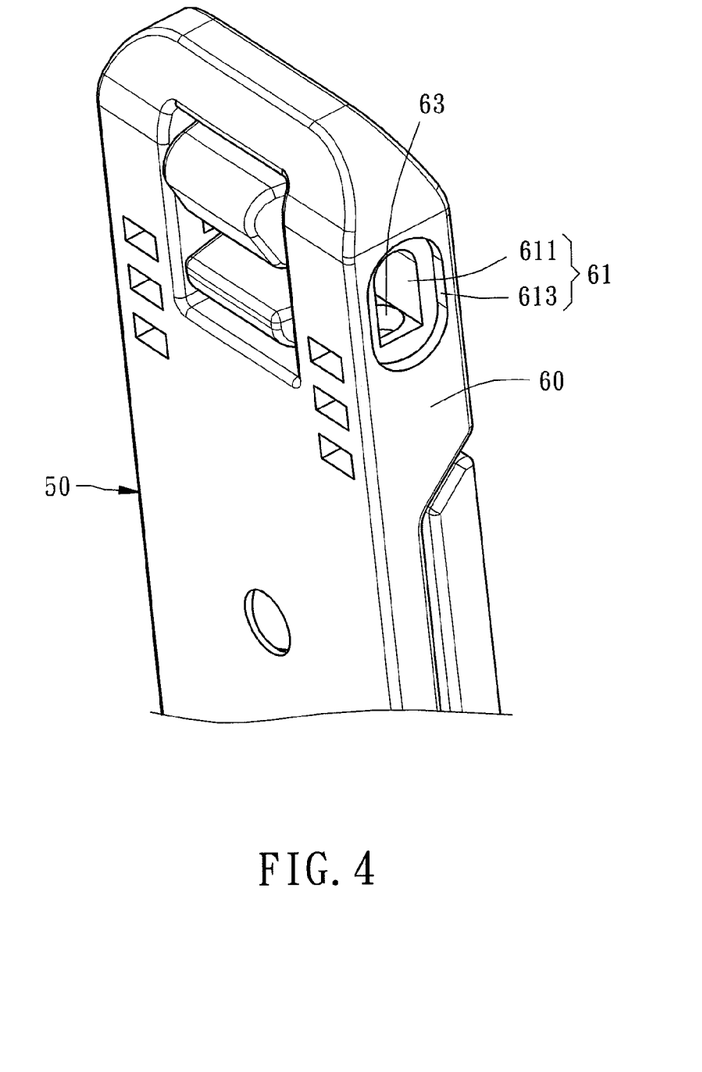
FIG. 4 is an enlarged view of a part of the device clip in accordance with the first embodiment of the present invention where the rod member of the second jaw member is not shown.
Figure 6:
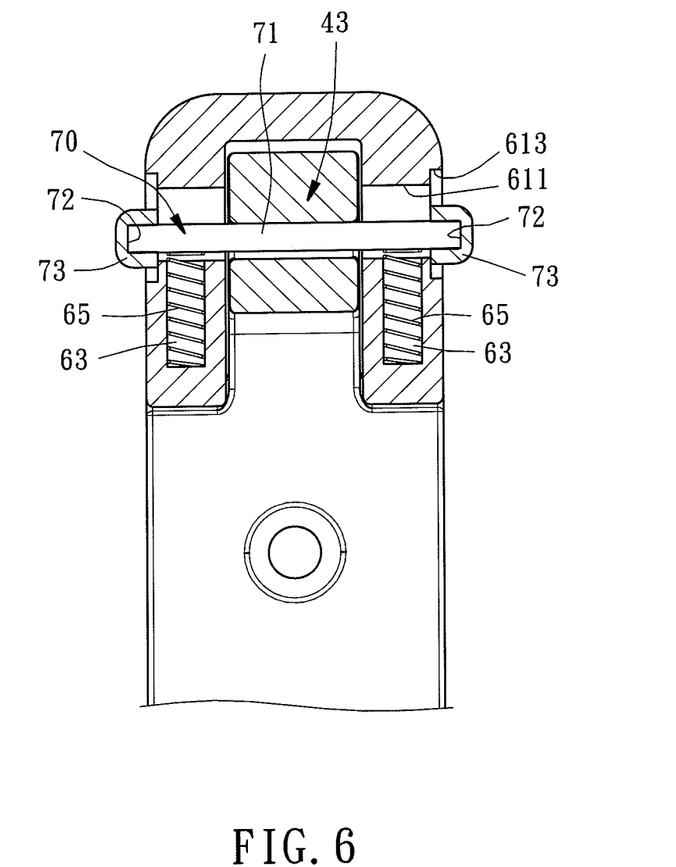
FIG. 6 is a longitudinal sectional front view of a part of the device clip in accordance with the first embodiment of the present invention, illustrating the locking part of the first jaw member stopped against the rod member.
Figure 8:
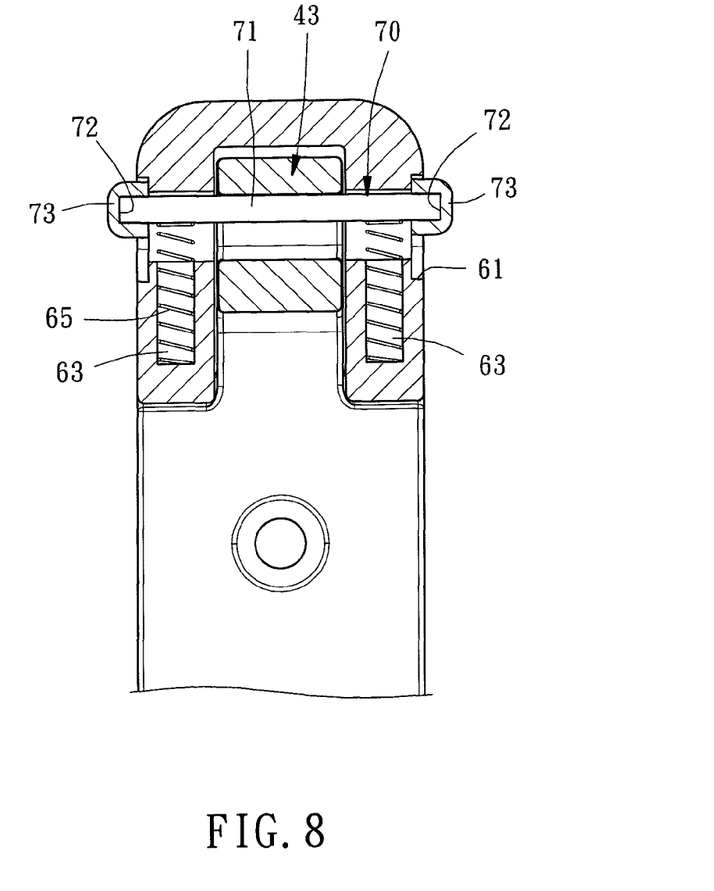
FIG. 8 is a sectional front view of a part of the device clip in accordance with the first embodiment of the present invention, illustrating the rod member engaged in the retaining groove of the first jaw member.

Further, as shown in FIG. 4, FIG. 6 and FIG. 8, each lug 60 comprises an oblong hole 61 extending in the direction of the major axis of the second jaw member 50, a recess 63 extended from the hole wall of the oblong hole 61 toward the pivot connection part 51, and a spring 65 accommodated in the recess 63. Each oblong hole 61 has a small diameter portion 611 and a large diameter portion 613. Further, as shown in FIG. 2, FIG. 6 and FIG. 8, the two opposite ends 72 of the rod member 70 are respectively capped with a respective end cap, forming a respective operating portion 73.

During installation of the second jaw member 50, set the respective springs 65 in the respective recesses 63, and then insert the rod member 70 through the oblong holes 61 of the two lugs 60 to have the two opposite ends 72 of the rod member 70 be respectively accommodated in the respective oblong holes 61. At this time, the springs 65 are stopped against the rod member 70. Thereafter, attach the operating portions (end caps) 73 to the two ends 72 of the rod member 70. At this time, the operating portions 73 are abutted against the small diameter portions 611 of the associating oblong holes 61 and accommodated in the associating large diameter portions 613. Thus, the rod member 70 can be limited between the two oblong holes 61 and forced to move along the major axis of the second jaw member 50 and to compress the springs 65. After the applied force is disappeared, the springs 65 immediate return the rod member 70 to its former position.

Figure 5:
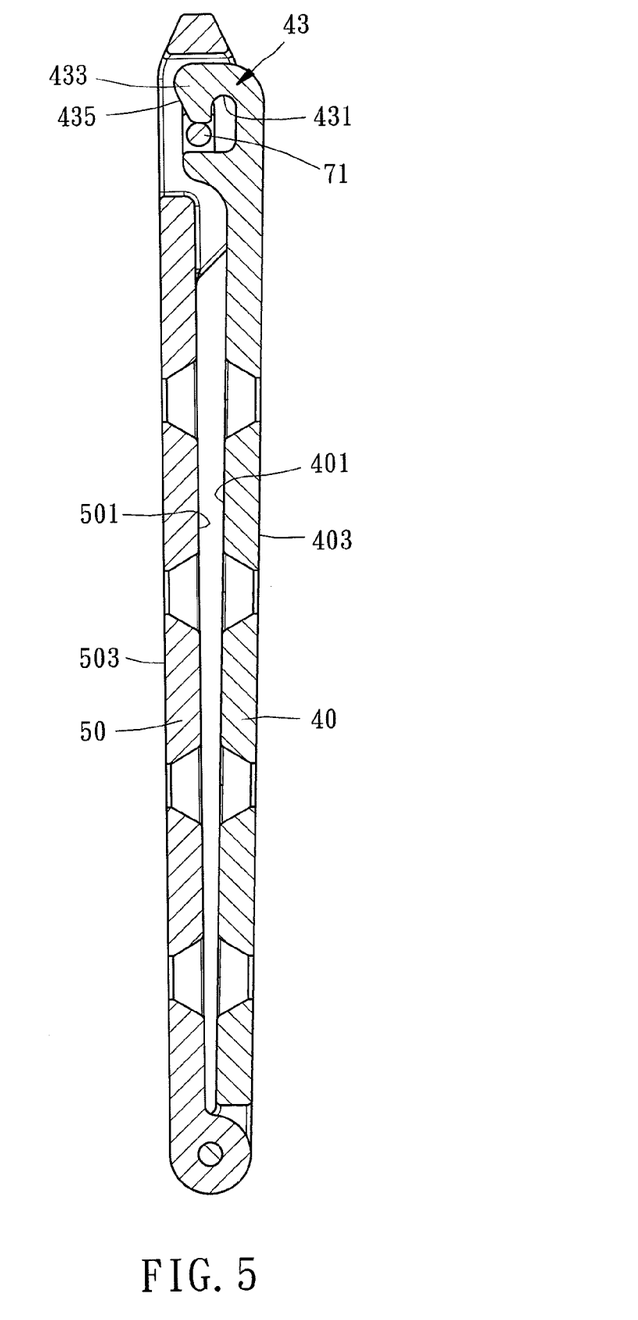
FIG. 5 is a longitudinal sectional side view of the device clip in accordance with the first embodiment of the present invention, illustrating the locking part of the first jaw member stopped against the rod member.
Figure 7:
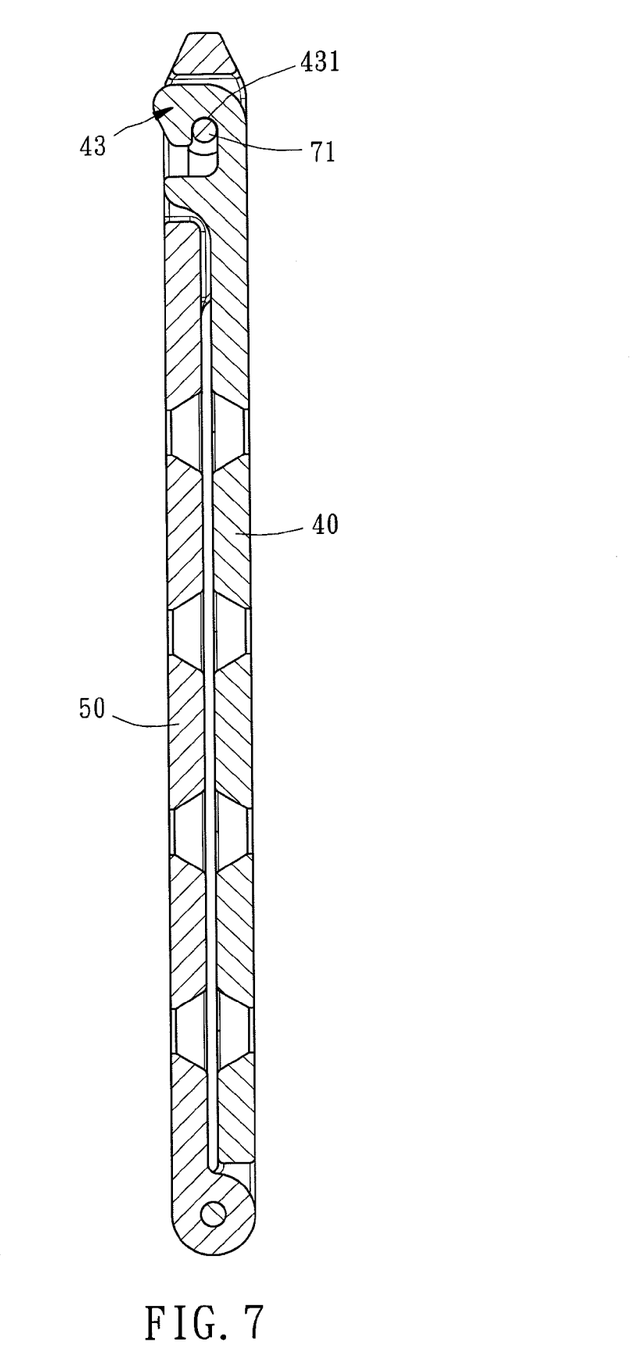
FIG. 7 is a longitudinal sectional side view of the device clip in accordance with the first embodiment of the present invention, illustrating the rod member engaged in the retaining groove of the first jaw member.

When assembling the device clip 30, as shown in FIG. 2, pivotally connect the pivot connection part 51 of the second jaw member 50 to the pivot connection part 41 of the first jaw member 40 with a pivot, allowing the second jaw member 50 to be biased relative to the first jaw member 40. At this time, the first jaw member 40 is not locked to the second jaw member 50, and the rod member 70 of the second jaw member 50 is in the normal position, i.e., in the upper halves of the oblong holes 61. Thereafter, as shown in FIG. 5 and FIG. 6, when biasing the first jaw member 40 toward the second jaw member 50 to attach the front hook portion 433 of the locking part 43 of the first jaw member 40 to the rod member 70, the rod member 70 will be forced to compress the springs 65 and to move along the guide face 435 of the locking part 43 of the first jaw member 40 to the lower halves of the oblong holes 61. When continuously biasing the first jaw member 40 toward the second jaw member 50 to force the rod member 70 toward the retaining groove 431 of the locking part 43 of the first jaw member 40, as shown in FIG. 7 and FIG. 8, the rod member 70 will be released from the pressure, and the elastic potential energy of the springs 65 will immediately push the rod member 70 back to the upper halves of the oblong holes 61 to have the rod member 70 be engaged in the retaining groove 431 of the first jaw member 40. At this time, the first jaw member 40 and the second jaw member 50 are locked in the close position.

Thus, when using the device clip 30 to secure, for example, a backpack and a camera bag together, the body part 55 of the second jaw member 50 can be inserted through a loop (not shown) of the backpack, and the body part 45 of the first jaw member 40 can be inserted through a loop (not shown) of the camera bag, and then the backpack and the camera bag can be steadily linked together by engaging the rod member 70 into the retaining groove 431. Using the device clip 30 to link a backpack and a camera bag is simply an application example of the present invention. This application example is not a limitation. Further, the application of the device clip 30 is not limited to any particular mounting direction. In another application example, the first jaw member 40 can be inserted through the loop of the backpack, and the second jaw member 50 can be inserted through the loop of the camera bag.

Figure 9:
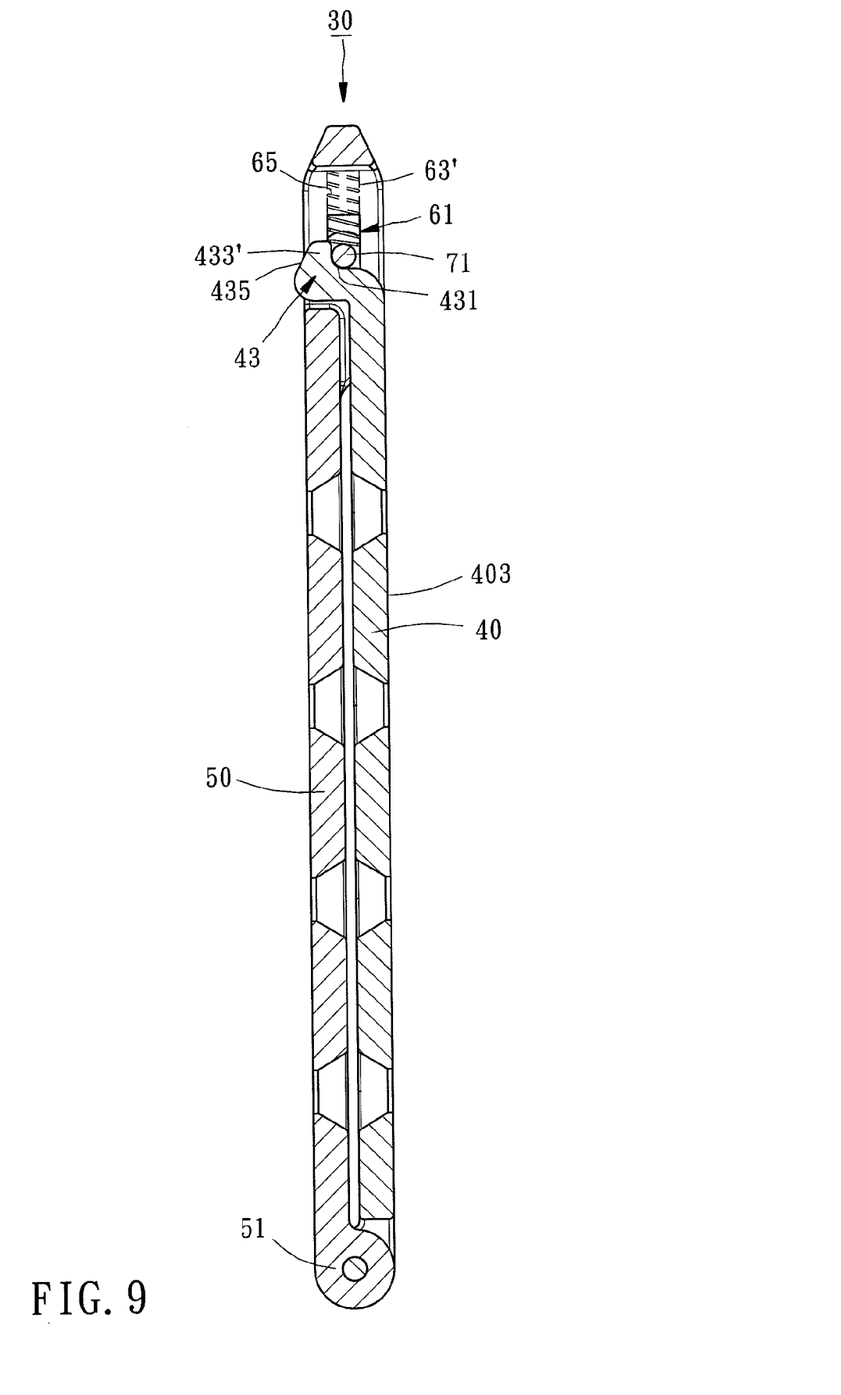
FIG. 9 is a longitudinal sectional side view of a device clip in accordance with a second embodiment of the present invention.

FIG. 9 illustrates a device clip 30 in accordance with a second embodiment of the present invention. According to this second embodiment, each recess 63' extends from the hole wall of the associating oblong hole 61 in a reversed direction relative to the pivot connection part 51 so that the rod member 70, when unstressed, is normally positioned in the lower halves of the oblong holes 61. Further, the front hook portion 433' of the first jaw member 40 extends from one side of the retaining groove 431 toward the outer side 403 of the first jaw member 40. Thus, when biasing the first jaw member 40 toward the second jaw member 50 to attach the front hook portion 433' to the rod member 70, the rod member 70 will be forced to compress the springs 65 and to move along the guide face 435 to the upper halves of the oblong holes 61. When the rod member 70 reaches the retaining groove 431, as shown in FIG. 9, the rod member 70 will be released from the pressure, and the elastic potential energy of the springs 65 will immediately push the rod member 70 back to the lower halves of the oblong holes 61 to have the rod member 70 be engaged in the retaining groove 431 of the first jaw member 40.

In conclusion, by means of engaging the rod member 70 of the second jaw member 50 of the device clip 30 in the retaining groove 431 of the first jaw member 40 for enabling the rod member 70 to be steadily held down in the retaining groove 431 by the elastic potential energy of the springs 65, the first jaw member 40 and the second jaw member 50 are firmly locked in the close position. Thus, the device clip 30 of the invention not only can overcome the drawbacks of the prior art method of using a Velcro tape to link two objects together, but also can be conveniently and rapidly mounted to link two objects together.

Figure 10:
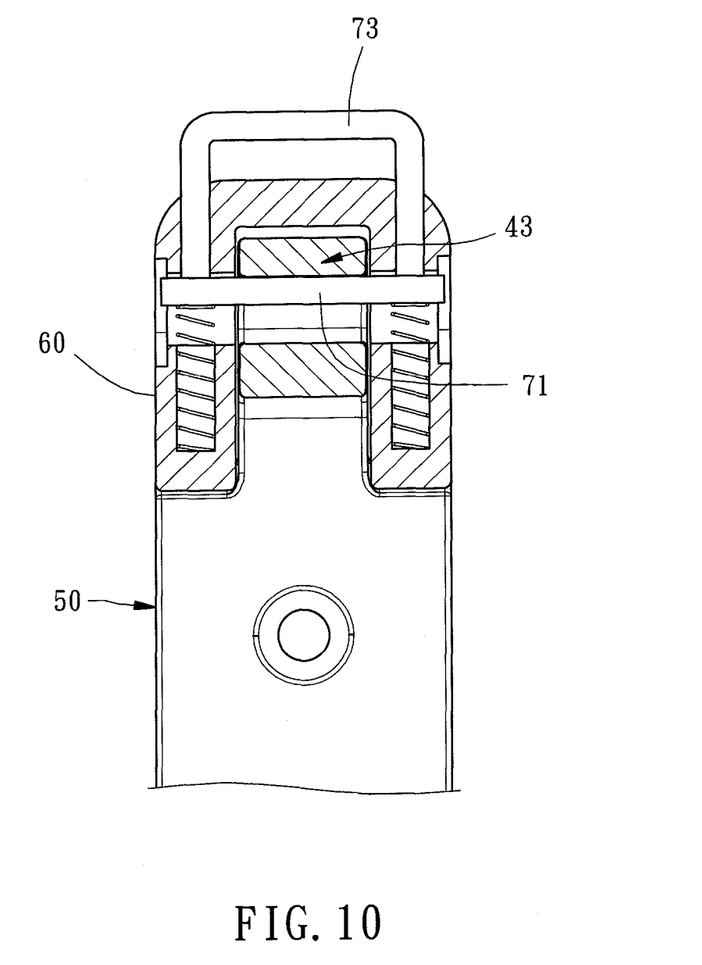
FIG. 10 is a sectional front view of a device clip in accordance with a third embodiment of the present invention.

FIG. 10 illustrates a device clip in accordance with a third embodiment. This third embodiment is substantially similar to the aforesaid second embodiment with the exception that the operating portions 73 are integrated into one member and disposed at the top side of the lugs 60. Alternatively, the operating portions 73 can be disposed at the front side or back side relative to the lugs 60. Further, if the first jaw member provides an operating portion, the operating portion can be disposed at two opposite lateral sides, front side, back side or top side relative to the lugs.

Figure 11:
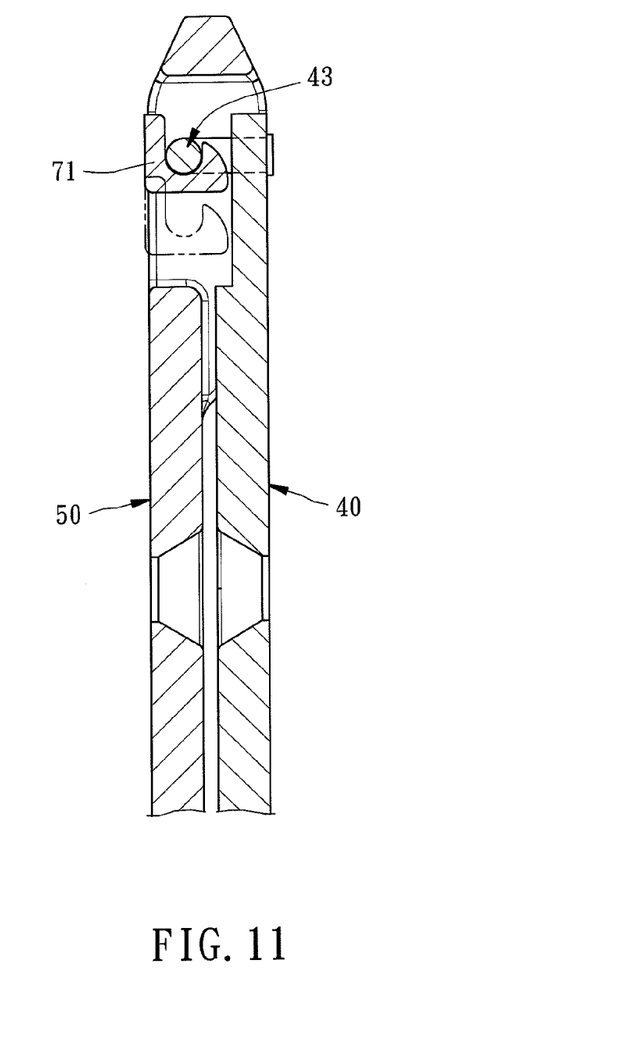
FIG. 11 is a schematic longitudinal sectional side view of a device clip in accordance with a fourth embodiment of the present invention.
Figure 12:
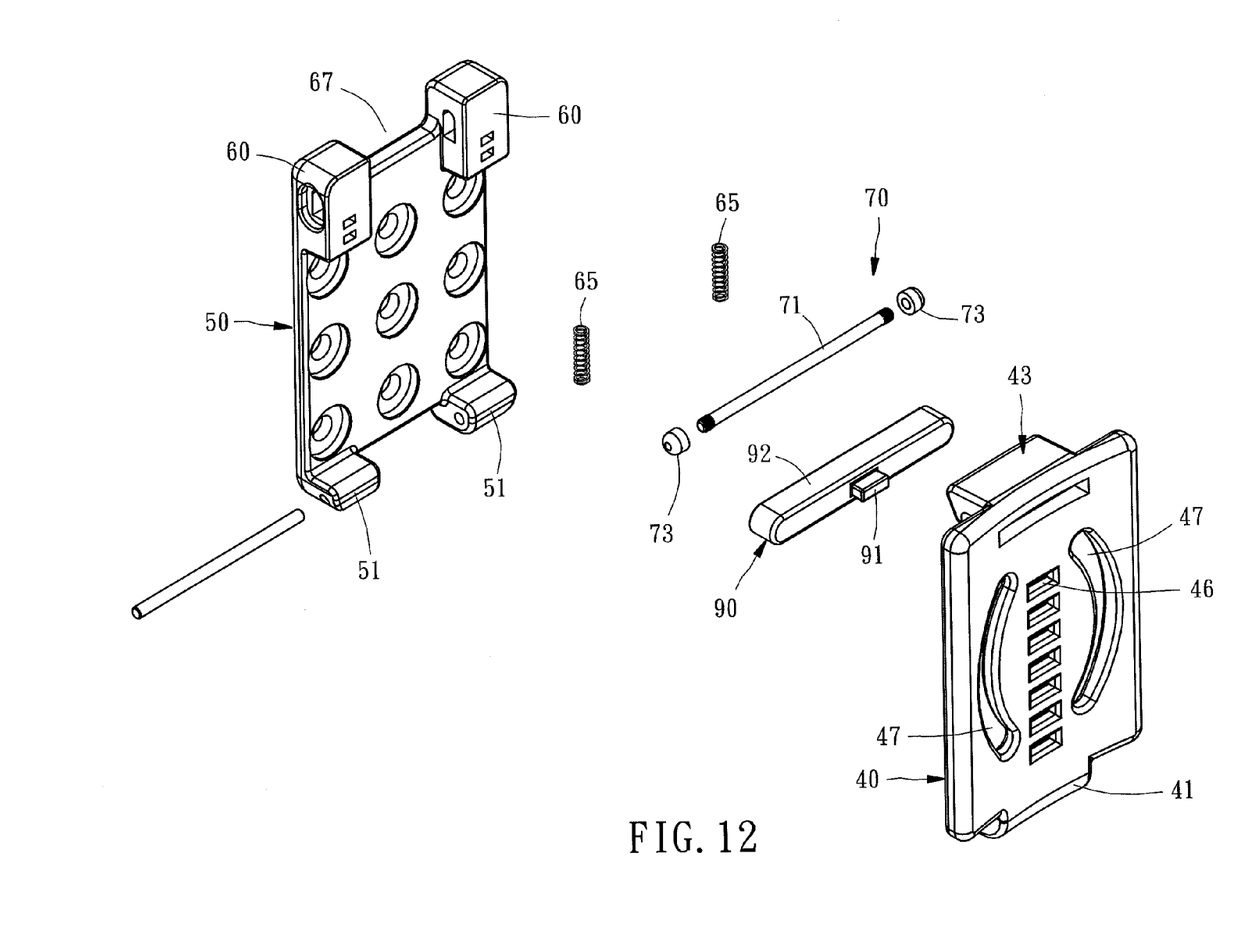
FIG. 12 is an exploded view of a device clip in accordance with a fifth embodiment of the present invention.
Figure 13:
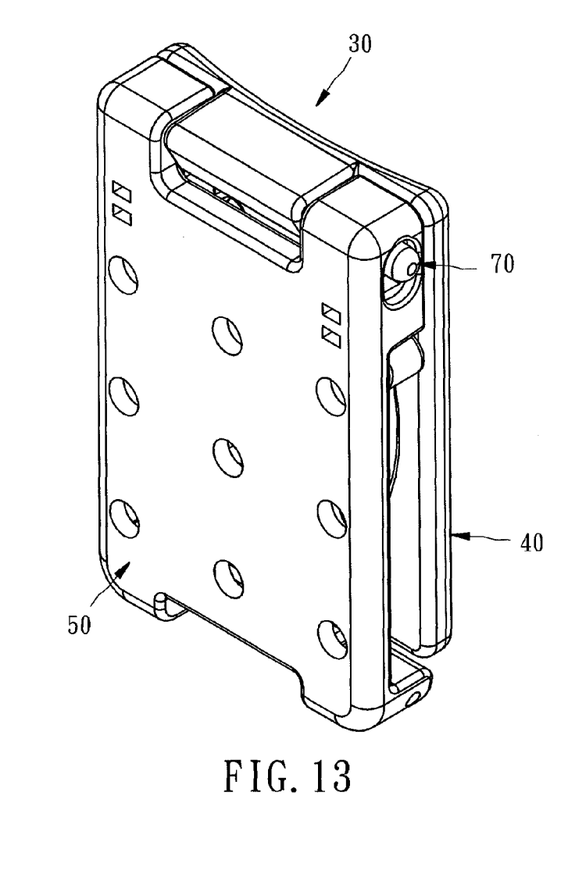
FIG. 13 is an elevational assembly view of the device clip in accordance with the fifth embodiment of the present invention.
Figure 14:
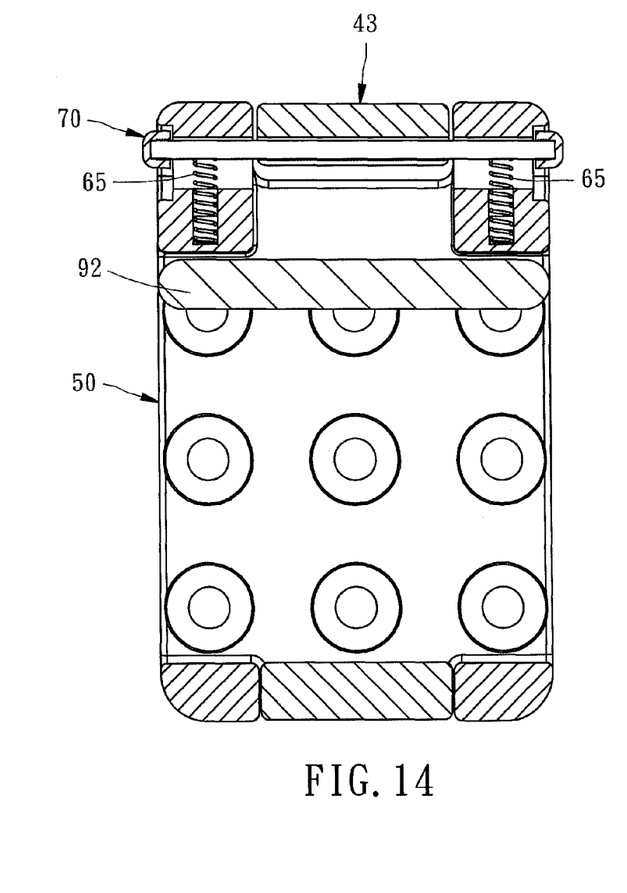
FIG. 14 is a sectional front view of the device clip in accordance with the fifth embodiment of the present invention.
Figure 15:
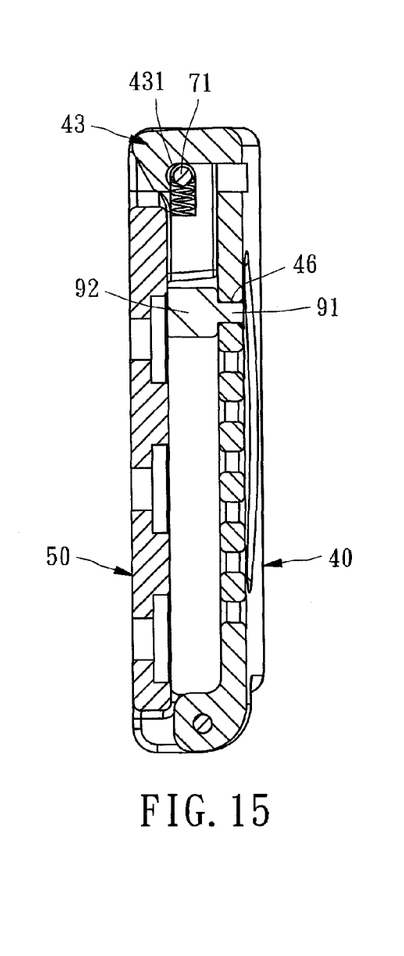
FIG. 15 is a longitudinal sectional side view of the fifth embodiment of the present invention, illustrating the device clip locked in the close position.
Figure 16:
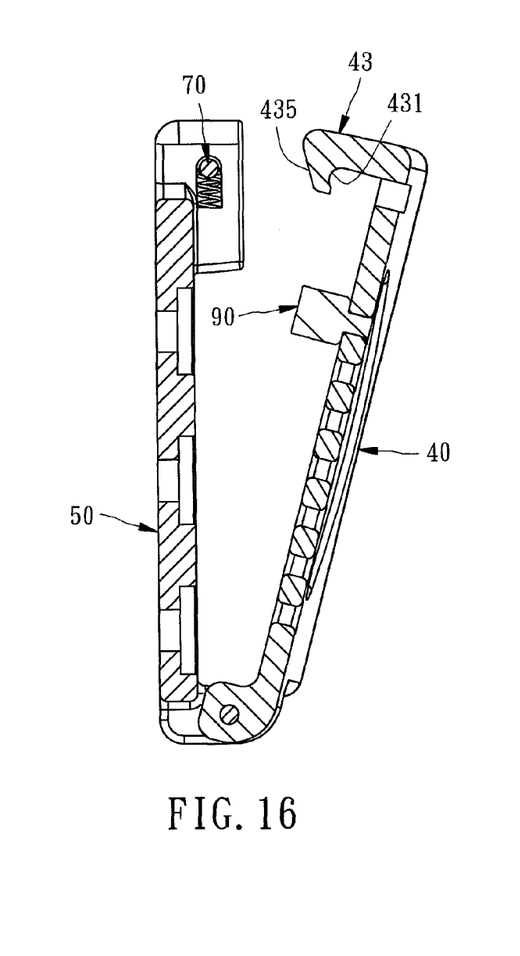
FIG. 16 is a longitudinal sectional side view of the fifth embodiment of the present invention, illustrating the device clip in an opened status.

FIG. 11 illustrates a device clip in accordance with a fourth embodiment. This fourth embodiment is characterized in that the locking part 43 of the first jaw member 40 is made in the form of a rod member, and the locking part 71 of the second jaw member 50 is made in the form of a hook.

FIGS. 12-16 illustrate a device clip in accordance with a fifth embodiment. According to this fifth embodiment, the device clip comprises a first jaw member 40 and a second jaw member 50. The first jaw member 40 comprises a locking part 43 defining a retaining groove 431 and a guide face 435. The second jaw member 50 comprises two springs 65 and a rod member 70. The rod member 70 comprises a locking part 71 and two operating portions 73. The main features of this fifth embodiment are outlined hereinafter.

The device clip further comprises a spacer member 90. The spacer member 90 comprises a mounting portion 91 fastenable to the first jaw member 40, and a spacer portion 92 connected to the mounting portion 91 and stoppable between the first jaw member 40 and the second jaw member 50 to provide a space between the first jaw member 40 and the second jaw member 50 and a clamping function.

The first jaw member 40 comprises a plurality of spacer member mounting holes 46 for the mounting of the mounting portion 91 of the spacer member 90 selectively, and two smoothly arched sliding slots 47 disposed at two opposite lateral sides relative to the spacer member mounting holes 46 to enhance the elastic deformability of the first jaw member 40. Further, the pivot connection part 41 of the first jaw member 40 is formed of one single component and disposed on the middle; the pivot connection part 51 of the second jaw member 50 is formed of two components and disposed at two opposite lateral sides; the second jaw member 50 has a relatively greater width with an opening 67 defined between the two lugs 60 thereof.

Except the aforesaid various embodiments of the present invention, any of the following designed can be added to the device clip.

For example, any other coupling structure can be used to substitute for the pivot connection part of the first jaw member and the pivot connection part of the second jaw member. Broadly speaking, the first jaw member has a coupling part, and the second jaw member has a coupling part.

Further, except that the locking part of the second jaw member provides a retaining groove, the locking part of the first jaw member can also be designed to provide a retaining groove.

Further, the locking part of the first jaw member can be an elastic part formed integral with the body part of the first jaw member, or, the locking part of the first jaw member can be detachably connected to the body part of the first jaw member. Similarly, the locking part of the second jaw member can be an elastic part formed integral with the body part of the second jaw member, or, the locking part of the second jaw member can be detachably connected to the body part of the second jaw member.

Further, except the design that the second jaw member provides an escape hole for receiving the locking part of the first jaw member, the first jaw member can also be designed to provide an escape hole for receiving the locking part of the second jaw member.

Further, except the design that the second jaw member provides lugs for the mounting of the locking part of the second jaw member, the first jaw member can also be designed to provide lugs for the mounting of the locking part of the first jaw member.

Further, except the design that the second jaw member provides oblong holes to limit the sliding movement of the locking part of the second jaw member, the first jaw member can also be designed to provide oblong holes to limit the sliding movement of the locking part of the first jaw member.

Further, except the design that the second jaw member provides recesses in communication with respective oblong holes and a spring in each of the recesses, the first jaw member can also be designed to provide recessed in communication with respective oblong holes and a spring in each of the recesses.

Further, except the design that the second jaw member provides a spring linked to the locking part of the second jaw, the first jaw member can also be designed to provide a spring link for linking with the locking part of the first jaw member.

Further, except the design the locking part of the second jaw member provides a guide face for guiding the locking part of the first jaw member, the locking part of the first jaw member can also be designed to provide guide face for guiding the locking part of the second jaw member.

Further, except the design the locking part of the second jaw member is movable connected to the body part of the second jaw member, the first jaw member can also be designed to the locking part thereof movably connected to the body part of the first jaw member.

Further, broadly speaking, each end cap of the second jaw member is an operating portion; except the design that the second jaw member provides an operating portion for allowing the user to move the locking part of the second jaw member, the first jaw member can also be designed to provide an operating portion formed of an end cap.

Further, except the design that the locking part of the second jaw member is slidably movable, the locking part of the second jaw member can be configured for swinging motion. Similarly, the locking part of the first jaw member can be configured for sliding movement or swinging motion.

At final, except the design that the second jaw member provides springs for linking with the locking part of the second jaw member, the first jaw member can also be designed to provide springs for linking with the locking part of the first jaw member. Further, the springs of the first jaw member or second jaw member can be compression springs, tensile springs, plate springs or torsion spring.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A device clip, comprising:

a first jaw member comprising a body part, and a coupling part and a locking part respectively connected to two opposite ends of the body part of said first jaw member; and a second jaw member comprising a body part, and a coupling part and a locking part respectively connected to two opposite ends of the body part of said second jaw member, the coupling part of said second jaw member being coupled to the coupling part of said first jaw member so that the locking part of said second jaw member being detachably lockable to the locking part of said first jaw member, wherein said second jaw member comprises two lugs protruding from said body part in direction toward said first jaw member, and each of said lugs comprises an oblong hole, wherein said second jaw member comprises a rod member inserted through and movable along said oblong holes, said rod member forms said locking part of said second jaw member between said two lugs, and said rod member comprises two operating portions outside said oblong holes respectively and operable to move said rod member, and wherein said second jaw member comprises two springs accommodated in said lugs respectively, and said springs are stopped against said rod member.

2. The device clip as claimed in claim 1, wherein said coupling part of said first jaw member is a pivot connection part, said coupling part of said second jaw member is a pivot connection part pivotally connected to the pivot connection part of said first jaw member.

3. The device clip as claimed in claim 1, wherein the locking part of said first jaw member is a hook defining a retaining groove.

4. The device clip as claimed in claim 1, wherein the locking part of said first jaw member comprises a guide face movable against the locking part of said second jaw member.

5. The device clip as claimed in claim 1, wherein each said lug further comprises a recess disposed in communication with said oblong hole, said springs are respectively mounted in said recesses.

6. The device clip as claimed in claim 1, wherein each said operating member is formed of an end cap.

7. The device clip as claimed in claim 1, further comprising a spacer member set between said first jaw member and said second jaw member.

8. The device clip as claimed in claim 7, wherein said spacer member comprises a mounting portion mounted at said first jaw member; said first jaw member comprises at least one mounting hole for the mounting of said spacer member.

* * * * *